(12) United States Patent
Tsukahara et al.

(10) Patent No.: US 8,345,319 B2
(45) Date of Patent: Jan. 1, 2013

(54) IMAGE READING APPARATUS

(75) Inventors: Hajime Tsukahara, Kanagawa (JP); Daisuke Nikaku, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 366 days.

(21) Appl. No.: 12/844,360

(22) Filed: Jul. 27, 2010

(65) Prior Publication Data

US 2011/0026085 A1 Feb. 3, 2011

(30) Foreign Application Priority Data

Jul. 30, 2009 (JP) .................................. 2009-178424
Jun. 11, 2010 (JP) .................................. 2010-133994

(51) Int. Cl.
*H04N 1/04* (2006.01)

(52) U.S. Cl. ......... 358/471; 358/474; 358/473; 358/497

(58) Field of Classification Search .................. 358/471, 358/474, 473, 497, 496

See application file for complete search history.

(56) References Cited

U.S. PATENT DOCUMENTS 7,595,913 B2 * 9/2009 Hirayama ..................... 358/471

7,800,790 B2 * 9/2010 Kageyama et al. ........... 358/474

FOREIGN PATENT DOCUMENTS

JP 2006-140599 6/2006
JP 4408771 11/2009

* cited by examiner

*Primary Examiner* — Houshang Safaipour

(74) *Attorney, Agent, or Firm* — Oblon, Spivak, McClelland, Maier & Neustadt, L.L.P.

(57) ABSTRACT

An image reading apparatus includes: an original reading unit that includes a plurality of first and second image sensor chips each arranged at a predetermined interval in a row along a main-scanning direction, wherein the two rows are arranged so that the first chips overlap the second chips in a zigzag manner in a sub-scanning direction; an image-data generating unit that generates first image data by correcting image data with a first correction coefficient, and generates a plurality of pieces of second image data by correcting image data with a plurality of types of second correction coefficients; a comparing unit that compares image data in an overlapping portion between the first image data and each of the plurality of pieces of second image data; and an image-data selecting unit that selects a piece of second image data based on a comparison result.

14 Claims, 9 Drawing Sheets

FIG. 4

● : SAMPLING POINT
○ : NEW SAMPLING POINT

| SHIFT AMOUNT d | W0 | W1 | W2 | W3 |
|---|---|---|---|---|
| 0 | 0 | 1 | 0 | 0 |
| 1/32 | −4/128 | 1 | 4/128 | 0 |
| ⋮ | | | | |
| 31/32 | 0 | 4/128 | 0 | −4/128 |

IMAGE READING APPARATUS

CROSS-REFERENCE TO RELATED APPLICATIONS

The present application claims priority to and incorporates by reference the entire contents of Japanese Patent Application No. 2009-178424 filed in Japan on Jul. 30, 2009 and Japanese Patent Application No. 2010-133994 filed in Japan on Jun. 11, 2010.

BACKGROUND OF THE INVENTION

1. Field of the Invention

The present invention relates to an image reading apparatus that reads an image of an original by a plurality of image sensors arranged in a zigzag manner, in an image scanner, a digital copier, a facsimile machine, and the like.

2. Description of the Related Art

Conventionally, reading devices installed in copiers and facsimile machines for example, and image reading devices such as scanners for inputting information to computers for automatically reading image information of originals are configured to read an image on an original by irradiating the original with light from a light source extended in a direction (main-scanning direction) perpendicular to a conveying path of the original (sub-scanning direction) and receiving reflected light from the irradiated original by an image sensor.

Furthermore, as a conventional method of reading an original, a method is generally used in which an original is irradiated with light from a xenon lamp used as a light source and reflected light from the original is read by an optical sensor via a reducing optical system. However, in recent years, for a purpose of reducing the size of an apparatus, a so-called CIS (Contact Image Sensor) has been put to practical use, in which an LED (Light Emitting Diode) having a small size is used as a light source and a linear sensor is caused to directly read an image via a self-focusing lens for example.

As the linear sensor applied to the CIS, a multichip-type image sensor array has been widely used, which is formed by aligning a plurality of sensor chips (light receiving chips) in each of which a large number of photoelectric conversion sensors is linearly arranged.

However, in the multichip-type image sensor array, because a gap exists between adjacent sensor chips, there is a problem in that an image of an original cannot be read in the gap and image information in the gap cannot be obtained.

To address this problem, a multichip-type image sensor array formed of sensor chips arranged in a zigzag manner may be applied so that the gap between the adjacent sensor chips can be filled by other sensor chips.

However, even when the sensor chips are arranged in a zigzag manner, a space remains between each chip in an even row arranged in the main-scanning direction and each chip in an odd row arranged in the main-scanning direction so as to cover gaps between the chips in the even row, so that image data of an image may be shifted between each chip in the even row and each chip in the odd row in the sub-scanning direction. Therefore, it is necessary to correct a shift amount in the sub-scanning direction. Furthermore, because mounting-accuracy of each chip varies, the correction amount of the shift in the sub-scanning direction may vary depending on each chip.

Moreover, in an apparatus that reads an image by moving an original, a position of the original may be shifted depending on a location because an original conveying speed may vary due to a shock that occurs when the original abuts against a roller that conveys the original, rotation variation of a motor, and the like. In this case, the correction amount of the shift in the sub-scanning direction may vary depending on the position of the original.

To solve the above problems, Japanese Patent Application Laid-open No. 2006-140599 discloses an apparatus that reads linear image patterns along the main-scanning direction and calculates a sub-scanning position where the liner image patterns match each other for each sensor chip, so that it can accurately correct the amount of mounting variation in the sub-scanning direction when the sensor chips are mounted in a zigzag manner.

However, an image reading apparatus disclosed in Japanese Patent Application Laid-open No. 2006-140599 cannot correct a sub-scanning image shift due to the variation in the original conveying speed, although it can correct variation due to the variation in the mounting accuracy of the chips.

SUMMARY OF THE INVENTION

It is an object of the present invention to at least partially solve the problems in the conventional technology.

According to an aspect of the present invention, there is provided an image reading apparatus including: an original reading unit that includes a plurality of first image sensor chips arranged at a predetermined interval in a first image sensor chip row along a main-scanning direction; and a plurality of second image sensor chips arranged at a predetermined interval in a second image sensor chip row along the main-scanning direction, wherein the first image sensor chip row and the second image sensor chip row are arranged so that the first image sensor chips overlap the second image sensor chips in a zigzag manner in a sub-scanning direction; an image-data generating unit that generates a piece of first image data by correcting image data read by each first image sensor chip with a first correction coefficient, and generates a plurality of pieces of second image data by correcting image data read by each second image sensor chip with a plurality of types of second correction coefficients; a comparing unit that compares image data in an overlapping portion between the first image data and each of the plurality of pieces of second image data; and an image-data selecting unit that selects a piece of second image data based on a comparison result obtained by the comparing unit from among the plurality of pieces of second image data.

According to another aspect of the present invention, there is provided an image reading apparatus comprising: original reading means for reading an original that includes a plurality of first image sensor chips arranged at a predetermined interval in a first image sensor chip row along a main-scanning direction; and a plurality of second image sensor chips arranged at a predetermined interval in a second image sensor chip row along the main-scanning direction, wherein the first image sensor chip row and the second image sensor chip row are arranged so that the first image sensor chips overlap the second image sensor chips in a zigzag manner in a sub-scanning direction; image-data generating means for generating a piece of first image data by correcting image data read by each first image sensor chip with a first correction coefficient, and generating a plurality of pieces of second image data by correcting image data read by each second image sensor chip with a plurality of types of second correction coefficients; comparing means for comparing image data in an overlapping portion between the first image data and each of the plurality of pieces of second image data; and image-data selecting means for selecting a piece of second image data based on a comparison result obtained by the comparing means from among the plurality of pieces of second image data.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram illustrating the amounts of line memories needed for each sensor chip for correcting a sub-scanning position;

DETAILED DESCRIPTION OF THE PREFERRED EMBODIMENTS

Exemplary embodiments of the present invention are described in detail below with reference to the accompanying drawings. The embodiments are described with an example in which the present invention is applied to an image reading apparatus that conveys an original being a read object to a fixed reading device section, and performs image reading by conveying the original at a predetermined speed.

Figure 1:
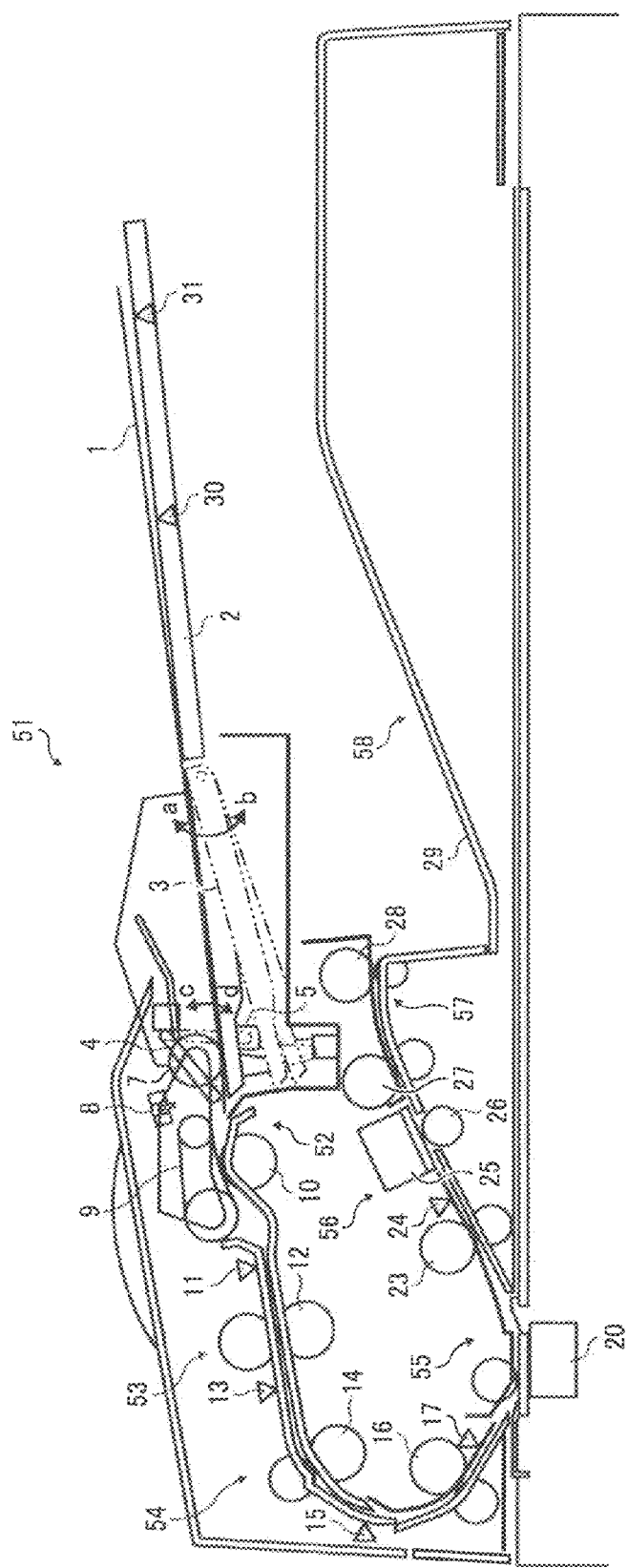
FIG. 1 is a cross-sectional view of a basic configuration of an image reading apparatus according to an embodiment.
Figure 2:
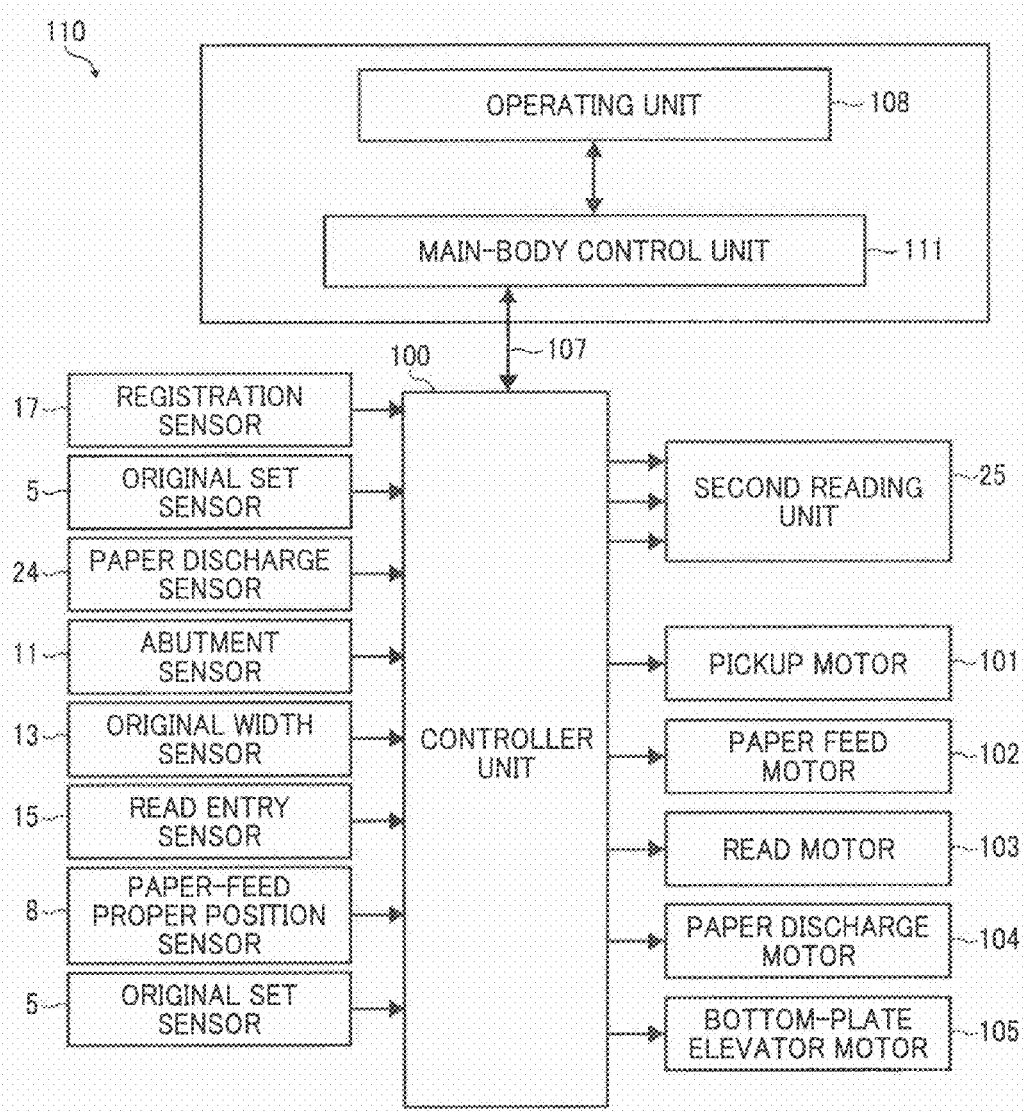
FIG. 2 is a control block diagram of the image reading apparatus according to the embodiment.

FIG. 1 is a cross-sectional view of a basic configuration an image reading apparatus according to an embodiment. FIG. 2 is a control block diagram of the image reading apparatus according to the embodiment.

In FIGS. 1 and 2, an image reading apparatus of the embodiment includes an original setting unit 51, a separating-feeding unit 52, a registration unit 53, a reversing unit 54, a first-read conveying unit 55, a second-read conveying unit 56, a paper discharging unit 57, a stacking unit 58, a driving unit formed of a pickup motor 101, a paper feed motor 102, a read motor 103, a paper discharge motor 104, and a bottom-plate elevator motor 105 (FIG. 2), and a controller unit 100 (FIG. 2). The original setting unit 51 sets a bundle of originals to be read. The separating-feeding unit 52 separates and feeds each original one by one from the set bundle of originals. The registration unit 53 performs primary abutting alignment to align the fed original, and causes the aligned original to be pulled out for conveyance. The reversing unit 54 reverses the conveyed original, and conveys the original with face turned to a read side (with face down). The first-read conveying unit 55 causes an image on a top side of the original to be read at a lower side of a contact glass. The second-read conveying unit 56 causes an image on a back side of the original to be read after reading of the top side is finished. The paper discharging unit 57 discharges the original out of the apparatus after reading of the top side and the back side is completed. The stacking unit 58 stacks and holds originals for which reading has been completed. The driving unit formed of the motors 101 to 105 drives the above conveying operations. The controller unit 100 controls a series of the above operations.

A procedure of a process of reading an original by the above-mentioned image reading apparatus is described below.

In FIG. 1, a bundle of originals 1 to be read is set with face up on an original table 2 including a movable original table 3. Then, positioning of the bundle of originals 1 in a width direction (a direction perpendicular to a conveying direction) is performed by a side guide (not shown). A set filler 4 and an original set sensor 5 detect the set originals. A signal indicating that the originals are detected is transmitted to a main-body control unit 111 via an I/F 107 illustrated in FIG. 2. An original-length detection sensor 30 or an original-length detection sensor 31 mounted on one surface of the original table 2 identifies substantial lengths of the originals in the conveying direction. Each of the original-length detection sensors 30 and 31 is formed of a reflective sensor or an actuator-type sensor capable of detecting even a sheet of original, and needs to be arranged so as to be able to identify at least one of a height and a width of an identical original size.

The movable original table 3 is configured so that it can be moved up and down in an "a" direction and a "b" direction by the bottom-plate elevator motor 105 (FIG. 2). The movable original table 3 is moved such that when the set filler 4 and the original set sensor 5 detect that the originals are set, the bottom-plate elevator motor 105 is rotated in a normal direction to elevate the movable original table 3 so that the topmost surface of the bundle of originals 1 comes into contact with a pickup roller 7. The pickup roller 7 is moved in a "c" direction and a "d" direction with a cam mechanism by the pickup motor 101 (FIG. 2). When the movable original table 3 is elevated, the pickup roller 7 is also elevated in the "c" direction by being pushed by the originals on the movable original table 3. A paper-feed proper position sensor 8 detects an upper-limit position of the pickup roller 7.

Then, when a print key of an operating unit 108 of an apparatus main body 110 illustrated in FIG. 2 is pressed and an original feed signal is transmitted from the main-body control unit 111 of the apparatus main body 110 to the controller unit 100 of an ADF (Auto Document Feeder) via the I/F 107, the paper feed motor 102 rotates in a normal direction to thereby rotate a roller of the pickup roller 7. Accordingly, the pickup roller 7 picks up several sheets of original (ideally, a sheet of original) from the original table 2.

Then, a paper feed belt 9 is driven in a paper feed direction along with the normal rotation of the paper feed motor 102. A reverse roller 10 is driven to rotate in a counter direction of the paper feed direction along with the normal rotation of the paper feed motor 102, so that the reverse roller 10 separates a topmost original from the rest of the originals to thereby feed only the topmost original.

More specifically, when the reverse roller 10 comes into contact with the paper feed belt 9 at a predetermined pressure or via a sheet of original, the reverse roller 10 rotates counterclockwise along with the rotation of the paper feed belt 9. Even when two or more sheets of original are inserted between the paper feed belt 9 and the reverse roller 10, the reverse roller 10 functions to push back extra sheets of original to prevent multiple paper feed.

An original separated in this manner is further conveyed by the paper feed belt 9, a leading end of the original is detected by an abutment sensor 11, and the original comes into contact with a pullout roller 12 being stopped. Subsequently, the original is conveyed for a predetermined distance after detection by the above-mentioned abutment sensor 11, and brought into pressure contact with the pullout roller 12 with predetermined deflection. In this state, driving of the paper feed belt 9 is stopped.

Subsequently, when the pickup roller 7 is separated from the top surface of the original, and then the paper feed belt 9 conveys the original, the leading end of the original enters a nip between a top roller and a bottom roller, which work as a pair, of the pullout roller 12. At this position, the leading end of the original is aligned (skew correction).

The pullout roller 12 conveys the original that has been subjected to the skew correction to an intermediate roller 14.

A plurality of original width sensors 13 are arranged in a depth direction of FIG. 1, and detects a size of the original, which is conveyed by the pullout roller 12, in a width direction perpendicular to the conveying direction. A length of the original in the conveying direction is detected based on a motor pulse by reading the leading end and the trailing end of the original by the abutment sensor 11.

When the original is conveyed from the registration unit 53 to the reversing unit 54 by the driving of the pullout roller 12 and the intermediate roller 14, a conveying speed at the registration unit 53 is set higher than a conveying speed at the first-read conveying unit 55. Therefore, a processing time for conveying the original to a reading unit is shortened.

Subsequently, when the leading end of the original is detected by a read entry sensor 15, the controller unit 100 starts decelerating the original conveying speed to make the original conveying speed equal to a read conveying speed before the leading end of the original enters a nip between a top roller and a bottom roller, which work as a pair, of a read entry roller 16. At the same time, the controller unit 100 rotates the read motor 103 in a normal direction to thereby drive the read entry roller 16, a read exit roller 23, and a CIS exit roller 27.

Then, when the leading end of the original is detected by a registration sensor 17, the controller unit 100 decelerates the original conveying speed for a predetermined conveying distance to temporarily stop the conveyance of the original short of a first reading unit 20. Furthermore, the controller unit 100 transmits a registration stop signal to the main-body control unit 111 via the I/F 107.

When receiving a read start signal from the main-body control unit 111, the controller unit 100 resumes the conveyance of the original by accelerating the conveying speed of the original that has been stopped for the registration to a predetermined conveying speed before the leading end of the original reaches a read position.

The controller unit 100 sends a gate signal indicating a valid image region on a first side and in a sub-scanning direction to the main-body control unit 111 at a timing at which the leading end of the original detected based on a pulse count of the read motor 103 reaches the first reading unit 20. The gate signal is continuously transmitted until the trailing end of the original passes through the first reading unit 20.

At this time, in case of one-side original reading, the original that has passed through the first-read conveying unit 55 is conveyed to the paper discharging unit 57 via a second reading unit 25. In this case, when the leading end of the original is detected by a paper discharge sensor 24, the controller unit 100 rotates the paper discharge motor 104 in the normal direction to thereby rotate a paper discharge roller 28 counterclockwise. Furthermore, the controller unit 100 decelerates a paper-discharge-motor driving speed just before the trailing end of the original passes through a nip between a top roller and a bottom roller, which work as a pair, of the paper discharge roller 28 based on a paper-discharge-motor pulse count obtained after the paper discharge sensor 24 detects the leading end of the original, so that the original to be discharged to a paper discharge tray 29 is prevented from being shot out.

On the other hand, in a case of both-side original reading, the controller unit 100 transmits a gate signal indicating a valid image signal in the sub-scanning direction to the second reading unit 25 at a timing at which the leading end of the original reaches the second reading unit 25, based on a pulse count output by the read motor 103 after the paper discharge sensor 24 detects the leading end of the original. The gate signal is continuously transmitted until the trailing end of the original passes through the second reading unit 25.

A second read roller 26 prevents the original from floating in the second reading unit 25, and also functions as a reference white unit for acquiring shading data in the second reading unit 25.

Figure 3:
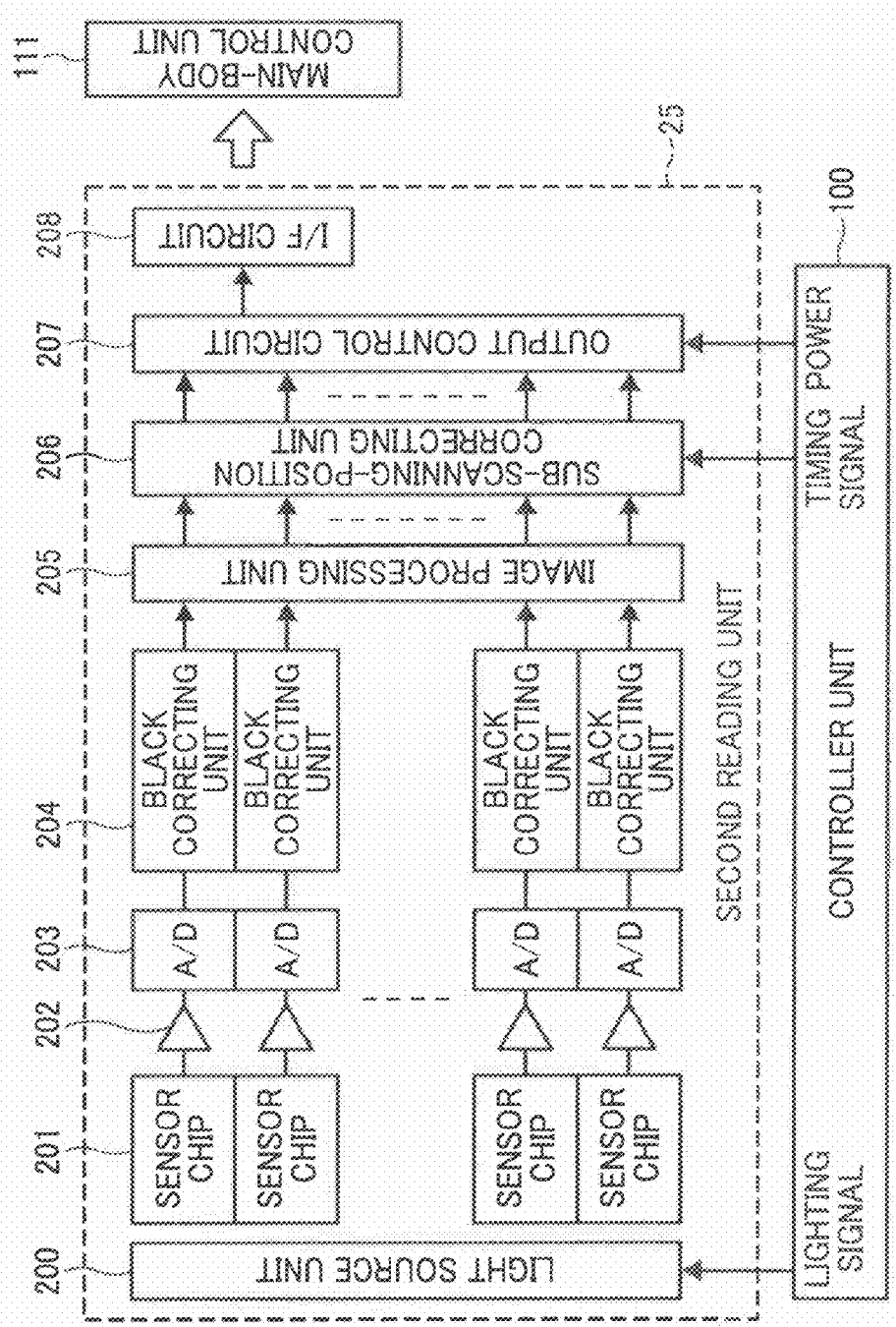
FIG. 3 is a block diagram illustrating main components of an electrical circuit of a second reading unit of the image reading apparatus.

FIG. 3 is a block diagram illustrating main components of an electrical circuit of the second reading unit 25.

As illustrated in FIG. 3, the second reading unit 25 includes a light source unit 200 formed of an LED array, a fluorescent lamp, a cold-cathode tube, or the like, a plurality of sensor chips 201 arranged along a main-scanning direction (a direction identical to the original width direction), a plurality of amplifier circuits 202 each connected to corresponding one of the sensor chips 201, a plurality of A/D converters 203 each connected to corresponding one of the amplifier circuits 202, a plurality of black correcting units 204 each arranged for corresponding one of the A/D converters 203 to remove black-level offset other than a signal component of a signal output by each A/D converter 203, an image processing unit 205, a sub-scanning-position correcting unit 206, an output control circuit 207, and an I/F circuit 208.

Each sensor chip 201 includes a photoelectric conversion element called a unity magnification contact image sensor, and a condensing lens.

In the embodiment, before an original (not shown) enters a read position in the second reading unit 25, the controller unit 100 transmits a lighting ON signal to the light source unit 200, so that the light source unit 200 is lighted. Light from the light source unit 200 is reflected by the entered original, and reflected light is condensed on the photoelectric conversion element by the condensing lens in the plurality of sensor chips 201, whereby image information is read.

The image information read by each sensor chip 201 is amplified by each amplifier circuit 202, and converted into digital image information by each A/D converter 203. These pieces of digital image information are subjected to a process of removing offset components therefrom by the black correcting units 204, input to the image processing unit 205 so as to be subjected to the shading correction, and subjected to correction of a sub-scanning position by the sub-scanning-position correcting unit 206 for each sensor chip 201.

Subsequently, the output control circuit 207 converts the pieces of digital image information into pieces of data in data format acceptable by the main-body control unit 111, and outputs the pieces of data to the main-body control unit 111 via the I/F circuit 208.

The controller unit 100 outputs a timing signal, which is used for notifying a timing at which the leading end of the original reaches the read position in the second reading unit 25, a lighting signal for the light source, power, and the like, and image data after the timing is handled as valid data.

Described below is the sub-scanning-position correcting unit 206 having a characteristic configuration of the embodiment.

Figure 4:
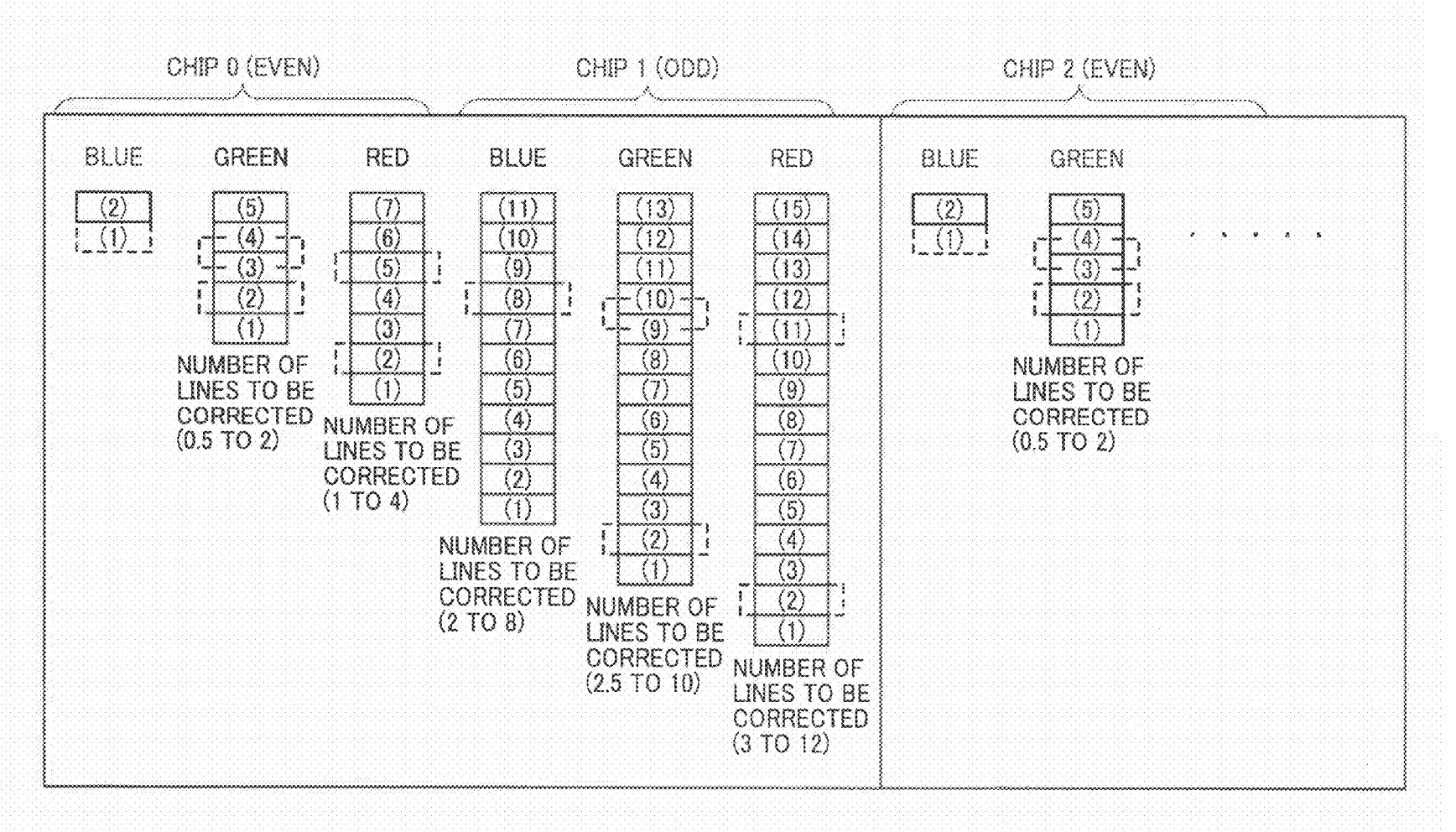

FIG. 4 is a diagram illustrating the amounts of line memories needed for each sensor chip 201 for correcting a sub-scanning position.

In the image reading apparatus, as a method of changing a magnification in the sub-scanning direction, there is provided a method of implementing a magnification change function by changing the original conveying speed or a method of implementing a magnification change function by electrically performing a magnification change process while maintaining the original conveying speed constant.

FIG. 4 illustrates the amounts of memories needed for correcting the sub-scanning position when the original conveying speed is changed in a range from 50% to 200% (on the assumption that the same magnification is 100%). Furthermore, the example illustrated in FIG. 4 is based on the assumption that an original is conveyed in an original conveying direction illustrated in FIG. 5.

Figure 5:
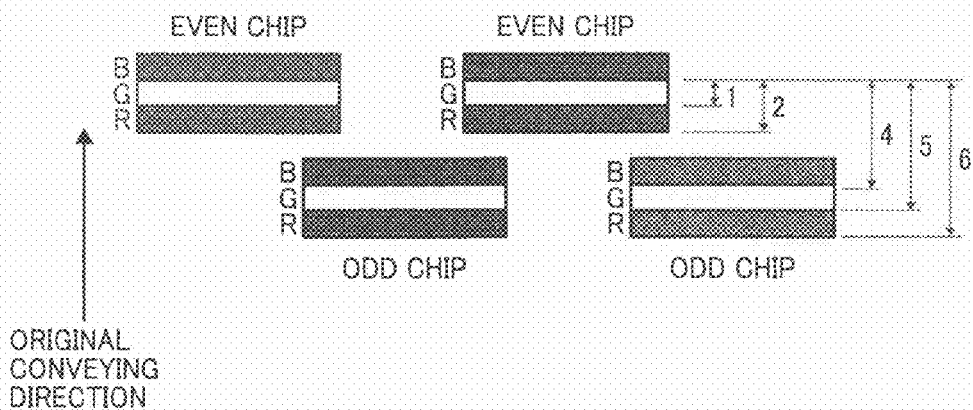
FIG. 5 is an arrangement diagram illustrating sensor chips arranged to overlap each other in a zigzag manner along a main-scanning direction.

FIG. 5 is an arrangement diagram illustrating the plurality of sensor chips 201 arranged on two lines (examples of a first image sensor chip row and a second image sensor chip row), one of which is for EVEN chips (examples of a first image sensor chip) and the other of which is for ODD chips (examples of a second image sensor chip), so as to overlap each other in a zigzag manner along the main-scanning direction. Furthermore, each sensor chip is formed of three lines for discriminating RGB three primary colors.

In FIG. 5, when the original conveying speed is 100%, the sub-scanning-position correcting unit 206 delays sub-scanning line positions with respect to the original moving direction based on Blue in the EVEN chip in such a manner that Green in the EVEN chip is delayed by one line, Red in the EVEN chip is delayed by two lines, Blue in the ODD chip is delayed by four lines, Green in the ODD chip is delayed by five lines, and Red in the ODD chip is delayed by six lines. Therefore, the sub-scanning-position correcting unit 206 can match RGB sub-scanning read positions with one another.

In order to deal with change in the magnification of the original conveying speed in a range from 50% to 200%, the sub-scanning-position correcting unit 206 needs to control the following amounts of delay for each line.

Figure 6:
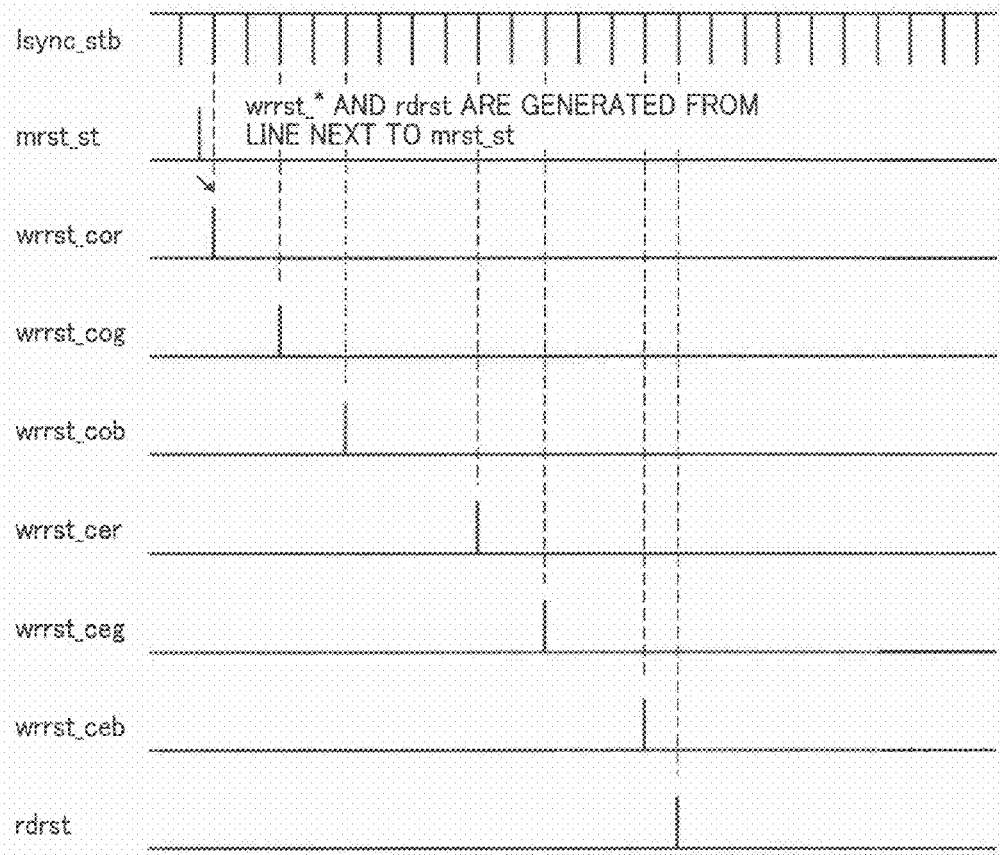
FIG. 6 is a diagram illustrating write and read timings of line memories of each sensor chip.

Green in the EVEN chip: 0.5 line to 2 lines
Red in the EVEN chip: 1 line to 4 lines
Blue in the ODD chip: 2 lines to 8 lines
Green in the ODD chip: 2.5 lines to 10 lines
Red in the ODD chip: 3 lines to 12 lines FIG. 6 is a diagram illustrating write and read timings of line memories of each sensor chip 201.

In FIGS. 4 and 6, when a line-memory write start signal (mrst_st) is activated by a register setting, a red write trigger signal for the ODD chip (wrrst_cor) is activated from a next line, so that write to a line memory (1) for Red in the ODD chip is started. Furthermore, line memories (2) and (3) and line memory addresses are updated per one line.

In other words, write to the line memory (1) for Red in the ODD chip is started from a line where the red write trigger signal for the ODD chip (wrrst_cor) occurs as illustrated in FIG. 6. Similarly, write to a line memory (1) for Green in the ODD chip is started from a line where a green write trigger signal for the ODD chip (wrrst_cog) occurs, and write to a line memory (1) for Blue in the ODD chip is started from a line where a blue write trigger signal for the ODD chip (wrrst_cob) occurs. Similarly, write to a line memory (1) for Red in the EVEN chip is started from a line where a red write trigger signal for the EVEN chip (wrrst_cer) occurs, write to a line memory (1) for Green in the EVEN chip is started from a line where a green write trigger signal for the EVEN chip (wrrst_ceg) occurs, and write to a line memory (1) for Blue in the EVEN chip is started from a line where a blue write trigger signal for the EVEN chip (wrrst_ceb) occurs.

Here, Isync_stb indicates a line synchronous signal.

Read from a line memory is started from a line next to the line where the blue write trigger signal for the EVEN chip (wrrst_ceb) occurs.

Furthermore, a start read address for each line memory is changed by control by the sub-scanning-position correcting unit 206 according to change in the magnification. When integer lines are to be corrected by sub-scanning line correction, it is possible to correct the lines by simply controlling the amount of delay for each line. However, if the amount to be corrected by the sub-scanning line correction is less than one line, i.e., a part after the decimal point, it is necessary to perform correction on the decimal part.

The correction on the decimal part is described below with reference to FIGS. 7 and 8.

Figures 7, 8:
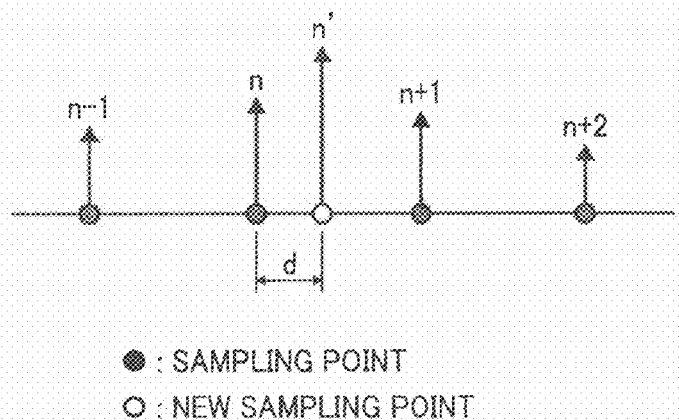
FIG. 7 is a conceptual diagram of calculation for obtaining data at a new sampling point based on pieces of data at four sampling points by using a cubic convolution method.
FIG. 8 is a comparison table containing correction coefficients of decimal parts for dealing with shift amounts in units of 1/32 line.

FIG. 7 is a conceptual diagram of calculation for obtaining data at a new sampling point based on pieces of data at four sampling points by using a cubic convolution method.

In FIG. 7, in the cubic convolution method, it is assumed that image data at a line of interest is (n), image data at one line after the line of interest is (n−1), image data at one line before the line of interest is (n+1), and image data at two lines before the line of interest is (n+2). According to the cubic convolution method, it is possible to obtain image data (n') at a point (new sampling point) between the image data (n) at the line of interest and the image data (n+1) at one line before the line of interest by using the pieces of image data at the above-mentioned four points.

In other words, assuming that a shift amount of the image data (n') at the new sampling point with respect to the image data (n) of the line of interest is "d", the image data (n') at the new sampling point can be obtained by performing interpolation operation with the above parameters. More specifically, the image data (n') at the new sampling point can be obtained by following Equation (1).

$$n'=W0\times(n-1)+W1\times n+W2\times(n+1)+W3\times(n+2) \qquad (1)$$

The length of each arrow in FIG. 7 indicates the amount of each sampled image data. In Equation (1), W0, W1, W2, and W3 represent correction coefficients. The relationships between the above-mentioned shift amount "d" and the correction coefficients W0, W1, W2, and W3 are those as illustrated in FIG. 8 for example.

FIG. 8 is a comparison table containing the correction coefficients of decimal parts for dealing with shift amounts in units of 1/32 line. As illustrated in FIG. 8, it is possible to obtain 32 sets of correction coefficients W0 to W3 in accordance with 32 line shift amounts "d" by using the above-mentioned cubic convolution method.

As described above, the pieces of image data for four lines is necessary to correct the decimal part, and it is necessary to simultaneously read the pieces of data from the four lines when reading data from line memories. In this case, when the magnification is set to 71% for example, correction coefficients for adjusting other lines are selected in the following manner based on a line for Blue in the EVEN chip.

Green in the EVEN chip: 1 line×71%/100%=0.71 line, and correction coefficients for the shift amount of 0.71×32/32=22/32 are selected (the amount of delay for the integer line is 0 line);

Red in the EVEN chip: 2 lines×71%/100%=1.42 lines, and correction coefficients for the shift amount of 0.42×32/32=13/32 are selected (the amount of delay for the integer line is 1 line);

Blue in the ODD chip: 4 lines×71%/100%=2.84 lines, and correction coefficients for the shift amount of 0.84×32/32=26/32 are selected (the amount of delay for the integer line is 2 lines);

Green in the ODD chip: 5 lines×71%/100%=3.55 lines, and correction coefficients for the shift amount of 0.55×32/32=17/32 are selected (the amount of delay for the integer line is 3 lines); and Red in the ODD chip: 6 lines×71%/100%=4.26 lines, and correction coefficients for the shift amount of 0.26×32/32=8/32 are selected (the amount of delay for the integer line is 4 lines).

More specifically, listed below with the line numbers of FIG. 4 are the four lines to be read from each chip at a line next to a line where a line-memory read trigger signal "rdtst" (see FIG. 6) occurs when the magnification is set to 71%.

Blue in the EVEN chip: line memory (1)

Green in the EVEN chip: line memories (2) to (5) (shift amount of a decimal part=22/32)

Red in the EVEN chip: line memories (3) to (6) (shift amount of a decimal part=13/32)

Blue in the ODD chip: line memories (6) to (9) (shift amount of a decimal part=26/32)

Green in ODD chip: line memories (7) to (10) (shift amount of a decimal part=17/32)

Red in ODD chip: line memories (8) to (11) (shift amount of a decimal part=8/32)

For subsequent lines, it is possible to correct a sub-scanning shift of RGB image data of EVEN chips and ODD chips, which are arranged in a zigzag manner, by repeatedly shifting the above line number of a read object line by one.

However, although the above-mentioned correction function is sufficient for performing correction when the original conveying speed does not vary depending on a conveying position, because the correction amount calculated in the above manner may be deviated when the original conveying speed varies depending on the conveying position, deviation may occur in accordance with the change in the speed even when the above-mentioned correction is performed.

Figure 9:
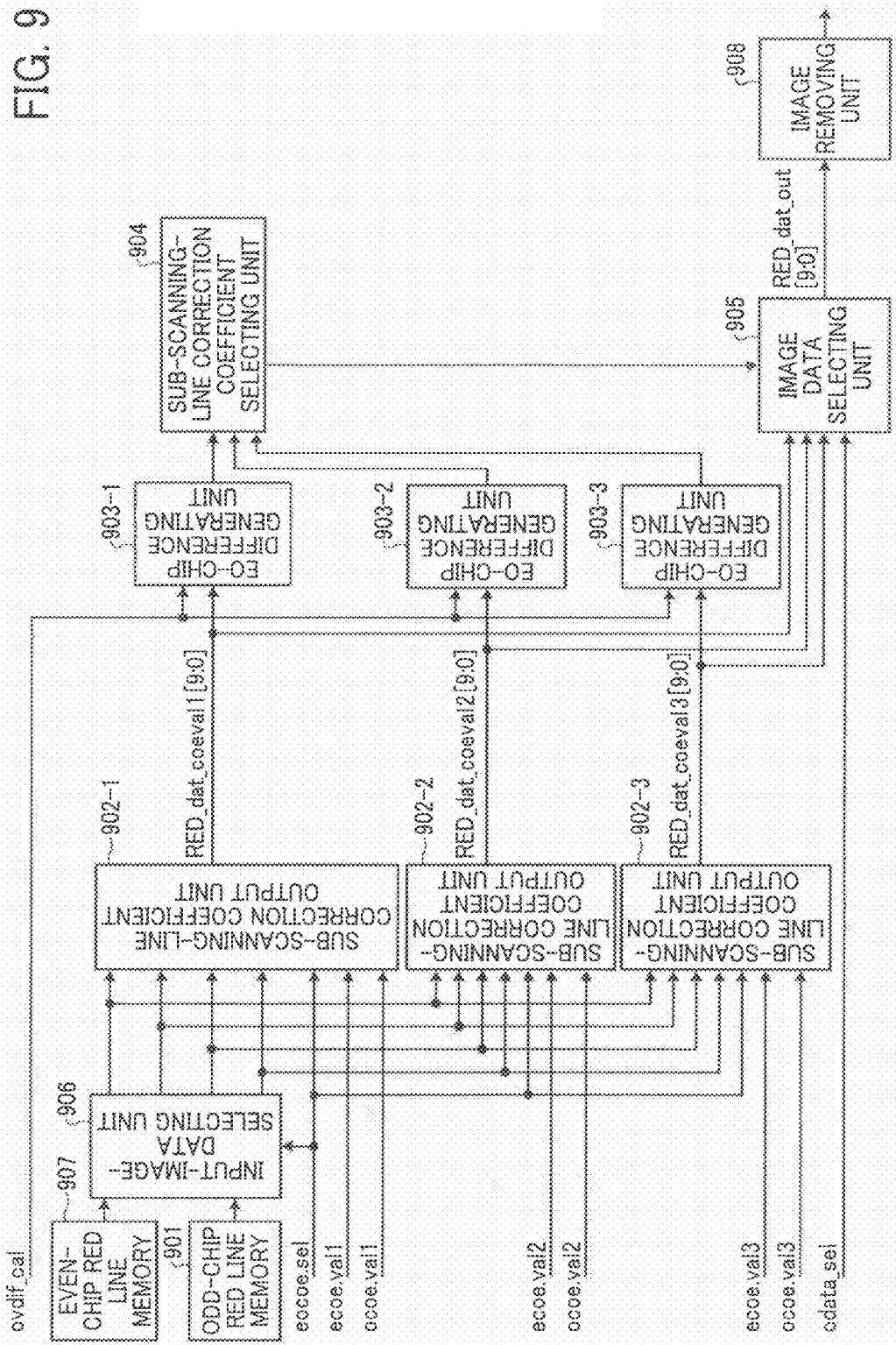
FIG. 9 is a block diagram illustrating a configuration example of a sub-scanning-position correcting unit.
Figure 10:
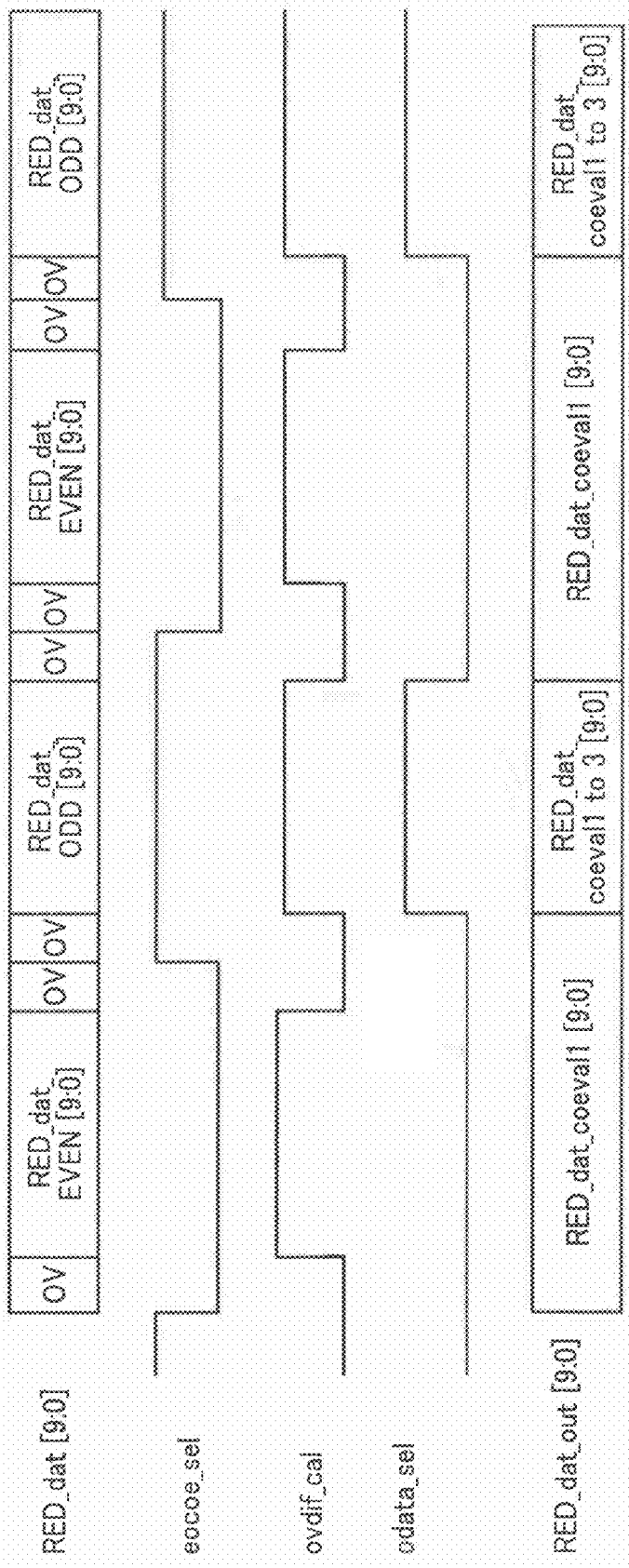
FIG. 10 is a control timing diagram of the sub-scanning-position correcting unit.

A method of preventing the above problem is described below with reference to FIG. 9, which illustrates a configuration example of the sub-scanning-position correcting unit 206, and FIG. 10, which is a timing diagram of control by the sub-scanning-position correcting unit 206. In the example of FIGS. 9 and 10, the sub-scanning-position correcting unit 206 performs a correction process for each line.

For simplicity of explanation, an example is explained in which color used in the correction process is limited to Red and the magnification is set to 71%.

When the magnification for Red is set to 71%, and if an EO (EVEN, ODD) chip selection signal "eocoe_sel" is "L", an input-image-data selecting (SEL) unit 906 selects line memory data of an EVEN-chip Red line memory 907, so that pieces of image data in lines having the line numbers (8) to (11) of FIG. 4 are output (memory selection circuits for the line numbers of FIG. 4 are not illustrated).

When the EO (EVEN, ODD) chip selection signal "eocoe_sel" is "H", the input-image-data selecting (SEL) unit 906 selects line memory data of an ODD-chip Red line memory 901, so that pieces of image data in lines having the line numbers (3) to (6) of FIG. 4 are output.

In FIGS. 9 and 10, "ecoe_val" indicates a correction coefficient for the EVEN chip and "ocoe_val" indicates a correction coefficient for the ODD chip. When the EO (EVEN, ODD) chip selection signal "eocoe_sel" is "L", the correction coefficient "ecoe_val" for the EVEN chip is selected, and, when the EO (EVEN, ODD) chip selection signal "eocoe_sel" is "H", the correction coefficient "ocoe_val" for the ODD chip is selected.

In the embodiment, sub-scanning-line correction coefficient output units 902-1, 902-2, and 902-3 (examples of an image data generating unit) illustrated in FIG. 9 are configured to respectively output pieces of image data RED_dat_coeval 1[9:0], 2[9:0], and 3[9:0], which are corrected by three different types of correction coefficients. However, it is possible to widen a correction range with respect to speed variance by increasing the number of types of the correction coefficients. Each piece of image data RED_dat_coeval 1[9:0] to 3[9:0] indicates 10-bit image data. Hereinafter, when it is not necessary to discriminate the sub-scanning-line correction coefficient output units 902-1 to 902-3 from each other, each of them is simply referred to as the sub-scanning-line correction coefficient output unit 902.

The amount of shift due to speed variance in the EVEN chip or the ODD chip is corrected based on either the EVEN chip or the ODD chip. In the embodiment, an example is described in which the correction is performed in conformity with the EVEN chip based on the ODD chip.

Assuming again that the magnification is set to 71%, a correction coefficient (an example of a first correction coefficient) for Red in the EVEN chip corresponds to a set of correction coefficients W0 to W3 associated with the shift amount of 13/32 as described above. The correction coefficient is used as a predetermined value and reflected as a setting value (i.e., the correction coefficients W0 to W3 associated with the shift amount of 13/32) of each of the correction coefficients "ecoe_val 1 to 3" for EVEN chips of the sub-scanning-line correction coefficient output units 902-1 to 902-3. In the embodiment, it is assumed that each of the correction coefficients "ecoe_val 1 to 3" for the EVEN chips corresponds to a set of the correction coefficients W0 to W3 associated with the shift amount of 13/32. Furthermore, image data generated by using these correction coefficients is assumed to be first image data.

On the other hand, when the magnification is set to 71%, a correction coefficient for Red in the ODD chip corresponds to a set of correction coefficients W0 to W3 associated with the shift amount of 8/32. In consideration of shift in the sub-scanning line due to the speed variance, it is assumed that a correction coefficient 1 "ocoe_val 1" for the ODD chip corresponds to a set of correction coefficients W0 to W3 associated with the shift amount of 8/32, a correction coefficient 2 "ocoe_val 2" for the ODD chip corresponds to a set of correction coefficients W0 to W3 associated with the shift amount of 7/32, and a correction coefficient 3 "ocoe_val 3" for the ODD chip corresponds to a set of correction coefficients W0 to W3 associated with the shift amount of 9/32. Furthermore, image data generated by the plurality of correction coefficients (examples of a plurality of types of second correction coefficients) is assumed to be second image data.

While an overlapping-portion calculation period signal "ovdif_cal" is "L" (see FIG. 10), each of EO-chip difference generating units 903-1 to 903-3 (examples of a comparing unit) compares OV (overlapping pixel) image data of the first image data with OV image data of the second image data to calculate a difference for each pixel, and calculates an average of the differences as many as the overlapping pixels. Hereinafter, when it is not necessary to discriminate the EO-chip difference generating units 903-1 to 903-3 from each other, each of them is simply referred to as the EO-chip difference generating unit 903.

Subsequently, a sub-scanning-line correction coefficient selecting (SEL) unit 904 (an example of a correction-coefficient selecting unit) selects a correction coefficient for an ODD chip for which the difference is smallest based on the result of calculation of the differences, and outputs a selection signal indicating the selected correction coefficient to an image data selecting (SEL) unit 905 (an example of an image-data selecting unit). While an ODD data selection signal "odata_sel" is "H", the image data selecting (SEL) unit 905 outputs the second image data corrected by the correction coefficient selected by the sub-scanning-line correction coefficient selecting (SEL) unit 904 (i.e., the correction coefficient indicated by the selection signal) as RED_dat_out [9:0]. Furthermore, while the ODD data selection signal "odata_sel" is "L", the image data selecting (SEL) unit 905 outputs the first image data related to red data of the EVEN chip as RED_dat_coeval 1 [9:0].

The overlapping pixels are removed by an image removing unit 908 being an image removal circuit. The overlapping pixels naturally form identical image data between the EVEN chip and the ODD chip, so that when the sub-scanning shift is corrected, each image data becomes identical in principle.

As described above, because the sensor chips are arranged in a zigzag manner and even when the conveying speed varies depending on a position of an original, it is possible to accurately correct the sub-scanning image shift by comparing overlapping portions between the first image data and each of the plurality of pieces of second image data and selecting a piece of the second image data for which a difference obtained by the comparison becomes smallest.

In the embodiment, an example has been described in which the correction is performed in conformity with the EVEN chip based on the ODD chip. However, the same operations can be applied to the case in which the correction is performed in conformity with the ODD chip based on the EVEN chip.

Furthermore, it is possible to improve the accuracy in selecting the correction coefficient when correcting the above sub-scanning image shift.

Figure 11:
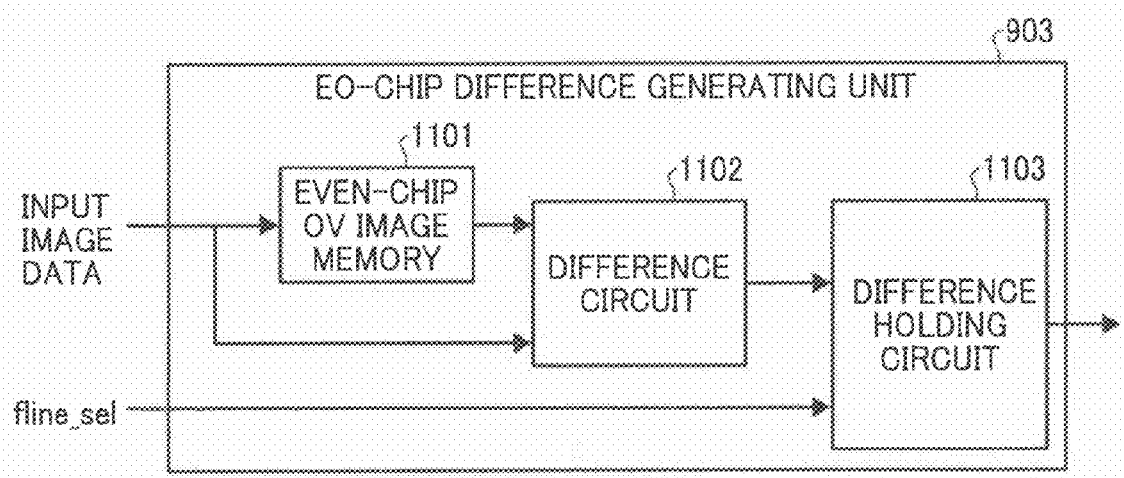
FIG. 11 is a block diagram of an EO-chip difference generating unit.

FIG. 11 is a block diagram of a circuit configuration example of the EO (EVEN, ODD)-chip difference generating unit 903.

In FIG. 11, image data of the EVEN chip (the first image data) is input before image data of the ODD chip (the second image data) (see the timing diagram of FIG. 10), so that the EO (EVEN, ODD)-chip difference generating unit 903 temporarily stores the OV image data of the EVEN chip (OV image data of the first image data) in an EVEN-chip OV image memory 1101. Each of image data of the EVEN chip and image data of the ODD chip is input to the EO (EVEN, ODD)-chip difference generating unit 903 per one line. Subsequently, the OV image data of the EVEN chip is read out from the EVEN-chip OV image memory 1101 at a timing at which the image data of the ODD chip (the second image data) is input, and a difference circuit 1102 calculates and adds differences of pixels between the OV image data of the EVEN chip and the OV image data of the ODD chip (OV image data of the second image data). Consequently, an added value of the differences of all the OV pixels for one line is calculated. Subsequently, a difference holding circuit 1103 stores (accumulates) pieces of the add values of the differences of all the OV pixels calculated by the difference circuit 1102 as many as the specified number of sub scanning lines specified by a sub-scanning line number setting signal "fline_sel" being a signal for specifying the number of lines in the sub-scanning direction. Then, the difference holding circuit 1103 calculates and outputs an area average value of the differences of the OV pixels based on the specified number of lines and the pieces of added values as many as the number of the lines.

As described above, the average of the differences between the OV image data of the EVEN chip and the OV image data of the ODD chip is calculated in units of the specified number of lines. Therefore, even when the number of overlapping pixels between the EVEN chip and the ODD chip is small, it is possible to improve the accuracy in selecting the correction coefficient.

Furthermore, assuming that an error occurs in selecting the sub-scanning correction coefficient, it is possible to reduce the effect due to the error when correcting the above sub-scanning image shift.

In this case, it is sufficient to configure the sub-scanning-line correction coefficient selecting (SEL) unit 904 illustrated in FIG. 9 not to update the selection signal to be output to the image data selecting (SEL) unit 905 when the minimum value of the difference values of the EO (EVEN, ODD)-chip difference generating unit 903 is equal to or larger than a predetermined value (an example of a predetermined first value), i.e., to output the selection signal for a preceding line as it is. Consequently, even when an unexpected shift occurs due to unexpected oscillation and the like, and the minimum value of the difference value is increased more than usual, the sub-scanning correction coefficient is not selected and the selection signal is not updated. As a result, it is possible to reduce the effect due to the error.

However, in a portion where the density of the original is uniform, e.g., when a character portion is included on the original, difference values of the EO-chip difference generating units 903-1 to 903-3 may not become different. In this case, it is sufficient to configure the sub-scanning-line correction coefficient selecting (SEL) unit 904 illustrated in FIG. 9 to compare the difference value output from each of the EO-chip difference generating units 903-1 to 903-3 and not to update the selection signal output to the image data selecting (SEL) unit 905 when the difference values are not different from each other by a predetermined value (an example of a second predetermined value) or more, i.e., when the maximum value of the difference between the difference values is equal to or smaller than a predetermined value. With this configuration, it is possible to prevent an abnormal correction coefficient from being selected.

As described above, three sub-scanning-line correction coefficient output units 902 are used in the embodiment. However, the present invention is not limited to this example, and three or more sub-scanning-line correction coefficient output units may be used. In this case, because three or more difference values are output from the EO (EVEN, ODD)-chip difference generating units 903, it is sufficient to configure the sub-scanning-line correction coefficient selecting (SEL) unit 904 illustrated in FIG. 9 such that it determines whether the minimum value of the difference values of the EO (EVEN, ODD)-chip difference generating units 903 is a local minimum value of the difference values, and, when the minimum value is the local minimum value, updates the selection signal with the selected correction coefficient and outputs the updated selection signal to the image data selecting (SEL)

unit 905. With this configuration, it is possible to further improve the accuracy in selecting the correction coefficient.

In an image reading apparatus in which sensor chips are arranged in a zigzag manner and a conveying speed varies depending on a position of an original, it is possible to accurately correct a sub-scanning image shift.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image reading apparatus comprising:
    an original reading unit that includes
        a plurality of first image sensor chips arranged at a predetermined interval in a first image sensor chip row along a main-scanning direction; and
        a plurality of second image sensor chips arranged at a predetermined interval in a second image sensor chip row along the main-scanning direction, wherein
        the first image sensor chip row and the second image sensor chip row are arranged so that the first image sensor chips overlap the second image sensor chips in a zigzag manner in a sub-scanning direction;
    an image-data generating unit that
        generates a piece of first image data by correcting image data read by each first image sensor chip with a first correction coefficient, and
        generates a plurality of pieces of second image data by correcting image data read by each second image sensor chip with a plurality of types of second correction coefficients;
    a comparing unit that compares image data in an overlapping portion between the first image data and each of the plurality of pieces of second image data; and
    an image-data selecting unit that selects a piece of second image data based on a comparison result obtained by the comparing unit from among the plurality of pieces of second image data.

2. The image reading apparatus according to claim 1, further comprising:
    a correction-coefficient selecting unit that outputs, to the image-data selecting unit, a selection signal indicating a second correction coefficient based on the comparison result obtained by the comparing unit, wherein
    the image-data selecting unit selects a piece of second image data corrected by the second correction coefficient indicated by the selection signal from among the plurality of pieces of second image data.

3. The image reading apparatus according to claim 2, wherein
    the correction-coefficient selecting unit outputs a selection signal indicating a second correction coefficient of a piece of second image data for which a difference from the first image data reaches a minimum value by referring to the comparison result obtained by the comparing unit.

4. The image reading apparatus according to claim 3, wherein
    the correction-coefficient selecting unit outputs the selection signal when the minimum value is a local minimum value of difference values between the first image data and each of the plurality of pieces of second image data.

5. The image reading apparatus according to claim 3, wherein
    the correction-coefficient selecting unit outputs the selection signal without updating the selection signal when the minimum value is equal to or larger than a first predetermined value.

6. The image reading apparatus according to claim 3, wherein
    the correction-coefficient selecting unit outputs the selection signal without updating the selection signal when a maximum value of the difference values between the first image data and each of the plurality of pieces of second image data is equal to or smaller than a second predetermined value by referring to the comparison result obtained by the comparing unit.

7. The image reading apparatus according to claim 1, wherein
    the comparing unit compares image data in an overlapping portion between pieces of the first image data in a plurality of lines and the plurality of pieces of second image data in the plurality of lines.

8. An image reading apparatus comprising:
    original reading means for reading an original that includes
        a plurality of first image sensor chips arranged at a predetermined interval in a first image sensor chip row along a main-scanning direction; and
        a plurality of second image sensor chips arranged at a predetermined interval in a second image sensor chip row along the main-scanning direction, wherein
        the first image sensor chip row and the second image sensor chip row are arranged so that the first image sensor chips overlap the second image sensor chips in a zigzag manner in a sub-scanning direction;
    image-data generating means for
        generating a piece of first image data by correcting image data read by each first image sensor chip with a first correction coefficient, and
        generating a plurality of pieces of second image data by correcting image data read by each second image sensor chip with a plurality of types of second correction coefficients;
    comparing means for comparing image data in an overlapping portion between the first image data and each of the plurality of pieces of second image data; and
    image-data selecting means for selecting a piece of second image data based on a comparison result obtained by the comparing means from among the plurality of pieces of second image data.

9. The image reading apparatus according to claim 8, further comprising:
    correction-coefficient selecting means for outputting, to the image-data selecting means, a selection signal indicating a second correction coefficient based on the comparison result obtained by the comparing means, wherein
    the image-data selecting means selects a piece of second image data corrected by the second correction coefficient indicated by the selection signal from among the plurality of pieces of second image data.

10. The image reading apparatus according to claim 9, wherein
    the correction-coefficient selecting means outputs a selection signal indicating a second correction coefficient of a piece of second image data for which a difference from the first image data reaches a minimum value by referring to the comparison result obtained by the comparing means.

11. The image reading apparatus according to claim 10, wherein
    the correction-coefficient selecting means outputs the selection signal when the minimum value is a local minimum value of difference values between the first image data and each of the plurality of pieces of second image data.

12. The image reading apparatus according to claim 10, wherein
the correction-coefficient selecting means outputs the selection signal without updating the selection signal when the minimum value is equal to or larger than a first predetermined value.

13. The image reading apparatus according to claim 10, wherein
the correction-coefficient selecting means outputs the selection signal without updating the selection signal when a maximum value of the difference values between the first image data and each of the plurality of pieces of second image data is equal to or smaller than a second predetermined value by referring to the comparison result obtained by the comparing means.

14. The image reading apparatus according to claim 8, wherein
the comparing means compares image data in an overlapping portion between pieces of the first image data in a plurality of lines and the plurality of pieces of second image data in the plurality of lines.

* * * * *

UNITED STATES PATENT AND TRADEMARK OFFICE
CERTIFICATE OF CORRECTION

PATENT NO. : 8,345,319 B2
APPLICATION NO. : 12/844360
DATED : January 1, 2013
INVENTOR(S) : Hajime Tsukahara et al.

Page 1 of 1

It is certified that error appears in the above-identified patent and that said Letters Patent is hereby corrected as shown below:

On the title page, Item (75), the second inventor's name is incorrect. Item (75) should read --(75) Inventors: Hajime Tsukahara, Kanagawa (JP);
                        Daisuke Nikaku, Kanagawa (JP)--

Signed and Sealed this
Twenty-sixth Day of February, 2013

Teresa Stanek Rea
*Acting Director of the United States Patent and Trademark Office*